Oct. 5, 1965     G. HJELTE     3,210,077

BODY MUSCULAR DEVELOPMENT DEVICE

Original Filed June 29, 1960     2 Sheets-Sheet 1

GEORGE HJELTE
INVENTOR.

BY *George C. Thompson*
agent.

Oct. 5, 1965          G. HJELTE          3,210,077
BODY MUSCULAR DEVELOPMENT DEVICE
Original Filed June 29, 1960          2 Sheets-Sheet 2
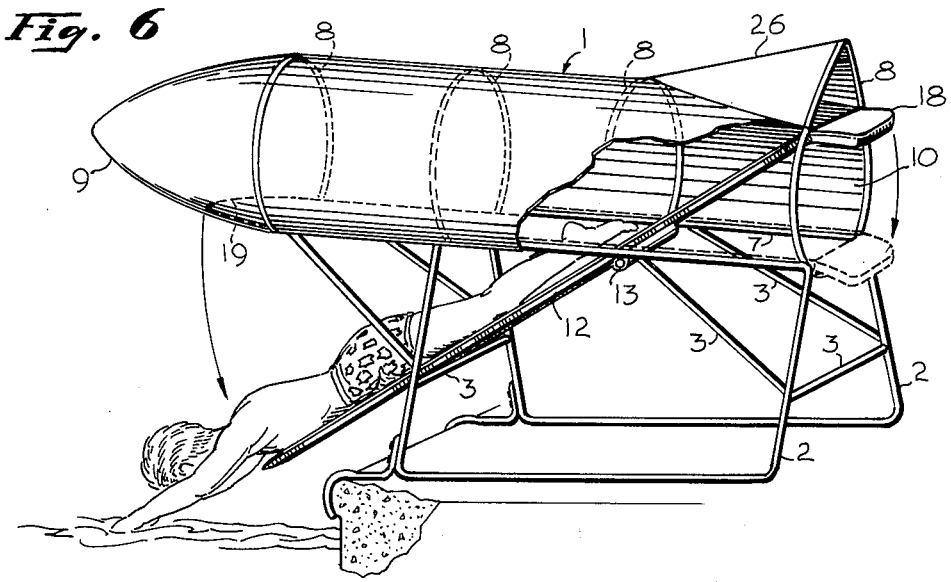
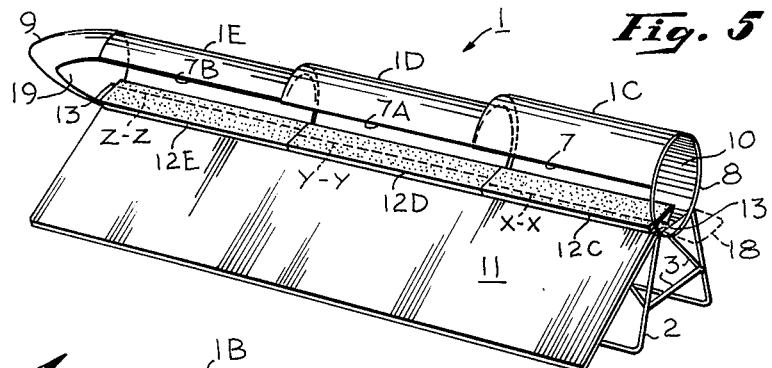
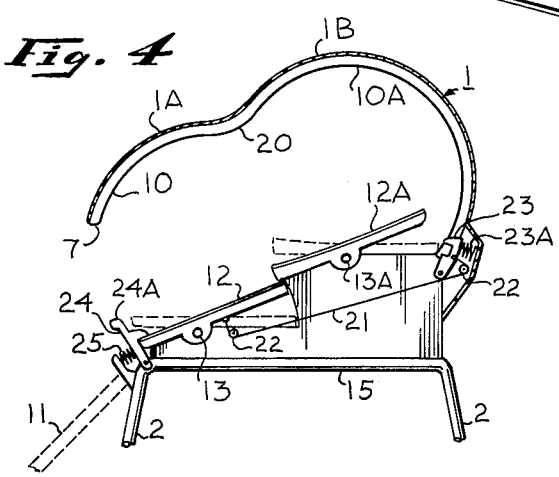
GEORGE HJELTE
INVENTOR.

United States Patent Office 3,210,077
Patented Oct. 5, 1965

3,210,077
BODY MUSCULAR DEVELOPMENT DEVICE
George Hjelte, 4468 Dundee Drive, Los Angeles 27, Calif.
Continuation of application Ser. No. 39,498, June 29, 1960. This application Aug. 14, 1964, Ser. No. 391,355
1 Claim. (Cl. 272—56.5)

This invention relates to a human body muscular development device and more particularly to a device for improving the muscular condition of selected body muscles while at the same time providing the needed appeal for enticing individuals to the exercise. This application is a continuation of my co-pending application Serial No. 39,498 now abandoned, filed June 29, 1960.

With the many games and playground activities provided in recreation areas there is a noted lack of equipment capable of directing children into the exercise of the muscles normally utilized during rolling or sliding down an incline into a soft pit or swimming pool.

It is, therefore, an object of this invention to provide a device sufficiently appealing to the individual to cause the individual to utilize the device for the purpose of muscular exercise of selected muscles of the body.

It is another object of this invention to provide a device for muscular development that appeals to and develops a sense of balance in younger individuals.

It is still another object of this invention to provide a device capable of cooperative operation by a plurality of persons without the danger of injury or conflict in the operation.

Other objects, purposes and characteristic features will become obvious as the description of the invention progresses.

In practicing this invention there is provided a device capable of directing the motion of the human body into a desired path in response to the positioning of the human body in a selected position within the device. The device is so arranged to cause the individual to assume the proper attitude for the body motion provided by the device.

In the drawings, FIGURE 1 is a view of one embodiment of the invention capable of causing a rolling motion of the body upon ejection from the device;

FIGURE 4 is a cross-sectional view of another embodiment of this invention illustrating the use of a device by a plurality of individuals;

FIGURE 5 is a view illustrating another embodiment of this invention capable of developing a sense of balance in the individual using the device; and FIGURE 6 is another embodiment of this invention showing a modified ejection device capable of a different body motion.

In each of the views of the drawings, similar parts bear like reference characters.

Figure 1:
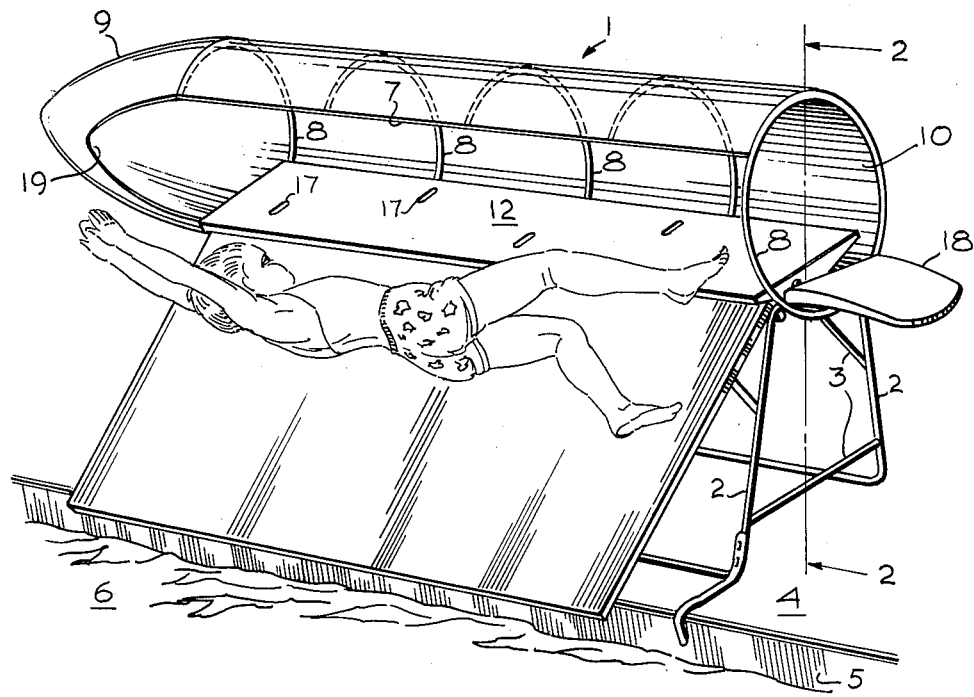

In the embodiment shown in FIGURE 1 there is provided a cylindrically shaped shell device 1 provided with a nose cone closing one end for forming a generally rocket shaped device. The rocket shaped device is capable of dictating a desired prone position of a human body within the device and is supported upon suitable frame and legs 2 provided with bracing members 3. The frame and legs 2 are capable of supporting the rocket shaped shell member 1 at a desired elevation above a supporting surface 4 adjacent an edge 5 of a pit or pool 6 containing sawdust or water, respectively.

The rocket shaped shell 1 is provided with an opening 7 extending longitudinally of the rocket shaped shell 1 for controlled exit or ejection therefrom. The rocket shell 1 is further provided with support ribs 8 each of which is cut away along the opening 7 to provide clear access out of the opening 7 into the pool or pit 6. The only support members or ribs 8 that are not cut away are the members positioned at either end of the ejection opening 7. The rocket shell 1 is closed at one end with a nose cone 9 and is formed with suitable entry opening 10 at the end opposite from the nose cone 9.

The opening 7 is located in the side of the rocket shell 1 in FIGURE 1 and is provided with a cooperating body directing member 11 positioned at the proper angle to cause the body ejected thereon through the opening 7 to roll down and into the pool or pit 6. It is desirable, therefore, for the supporting legs 2 to be of such height as to provide the proper angle for the selected length of the body directing member or device 11 to cause the individual ejected thereunto to roll and not skid or otherwise move into the pool 6.

In order for the body of any individual using the device to be placed upon the directing member 11 it is necessary to provide an ejection member 12 capable of causing directed but preferably unexpected ejection of the person located therein. In order to accomplish this action the ejection member 12 is pivotally supported on suitable pivot pins 13 supported within suitable bushings 14 mounted on a support base member 15 which is, in turn, supported on the frame and legs 2 (note FIGURES 2 and 3). The ejection member 12 may take the form of a flat surface supported on support members 16 at either end which in turn support the pivot pins 13, or as pointed out hereinafter the ejection member 12 might also take the form of a transversely curved member contoured to hold the individual using the device in a cupped position until ejection takes place, which in turn forces the individual to roll upon departure from the ejection device 12. Such ejection device is shown in FIGURE 4.

The ejection device 12 is also provided with suitable hand holes 17 to aid the individual in entering the rocket shaped shell 1.

It is pointed out that the ejection device may be pivoted at any position selected and desired. The different pivot positions selected will cause the ejection device 12 to be more or less stable, depending upon the position of the pivot. For example, if the pivot is selected to be at the middle of the transverse direction of the ejection device 12 it can be seen that as long as the individual using the device maintains his body weight to the side of the ejection device away from the opening 7 the ejection device will be stable and not cause ejection of the individual. A shift of his weight, however, to the side toward the opening and past the midpoint of the ejection device 12 would cause ejection of the body out through the opening 7.

Figure 3:
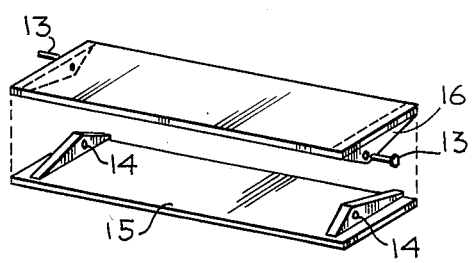
FIGURE 3 is a view of an ejection device usable in FIGURE 1 showing off-center pivot members.

If the pivot points are selected to be on opposite sides of a center line taken longitudinally of the ejection device such as shown in FIGURE 3 it can be seen that entry of the individual into the entry opening 10 will be stable with no ejection taking place until the individual has progressed into the rocket shape shell 1 sufficiently far to cause his weight or balance to be positioned to the opening 7 side of a balance line drawn between the two pivots 13. At this time the ejection device 12 will tilt causing the individual to roll out through the opening 7 and down the directing device 11 into the pool 6. It is pointed out that the sensitivity of the ejection device 12 is selected by the position of the pivots with respect to the transverse dimension of the ejection device.

It is also pointed out that the size of the rocket shaped shell 1 is selected to prevent the individual from entering the ejection device on hands and knees. The size of the shell 1 forces the individual to slide onto the ejection device thus automatically positioning the body for rolling action out through the opening 7.

For ease of entry a suitable apron 18 (which may be covered with rubber or the like) is provided adjacent the entrance opening 10. The apron 18 is supported upon the base member 15 or if desired may be supported on the frame and legs 2 of the support structure for the base member 15. The details of securing the base member 15 to the legs 2 is not shown since any suitable securing arrangement such as bolts or rivets may be used.

It is also pointed out that the nose cone 9 is cut away as at 19 to provide for hand and arm clearance of the individual at the time the ejection device 12 causes the individual to be ejected through the opening 7. It is desirable at this time to have the arms and hands positioned over the head for ease of rolling down the body directing member 11.

In the device of FIGURE 4 the support member 15 is provided with two pairs of pivot pins or members 13 and 13A for supporting two ejection devices 12 and 12A to accommodate two persons in the rolling exercise down the body directing member 11. In this structure the body rocket shell 1 is provided with a pair of position limiting overlapping openings 10 and 10A established by a suitable dip 20 between the lower and upper openings 10 and 10A, respectively. With the ejection devices positioned in the dotted line positions (FIGURE 4) it is possible for two individuals to slide within the shell member 1 and the areas 1A and 1B and onto the ejection devices 12 and 12A. In order to prevent improper sequencing of ejection, a suitable sequencing mechanism involving the release cable 21 guided by suitable pulleys 22 for releasing the hook device or latch 23 associated with the ejection device 12A is provided. Movement of the ejection device 12 to ejection position causes the cable 21 to be pulled and thus move the hook or latch 23 to its release position against the effects of a bias spring 23A. In addition a second suitable hook device or latch 24 associated with the ejection device 12 is provided for holding the ejection device 12 in its ejection position upon ejection of an individual through the opening 7 in the rocket shell 1. When this occurs the cable 21 is pulled over the pulleys 22 to pivot the latch 23 against its bias spring 23A allowing the ejection device 12A to also move to its ejection position if the individual thereon is in proper balance position. Assuming the individual in a position of weight balance toward ejection, the ejection device 12A will move to its ejection (solid line) position cooperating with the ejection device 12 (which is now latched in its ejection position) to thus allow the second individual to roll down the two ejection devices 12A and 12 unto the body directing device 11 and into the pool or pit (not shown).

It is pointed out that the latch mechanism 24 for the ejection device 12 is provided with an extension 24A for ease of release and is positioned at an out-of-the-way location to prevent injury by the individuals using this device. In addition the latch mechanism 24 is provided with a bias spring 25 for maintaining the latch in its latch locking position until released by anyone wishing to subsequently use this device.

It is noted that the ejection device 12A is shown contoured in its transverse direction to provide an additional urge or inclination to the individual thereon to roll instead of sliding off of the ejection device 12A. The ejection device 12 is shown flat, however, could also be contoured like the device 12A.

Figure 2:
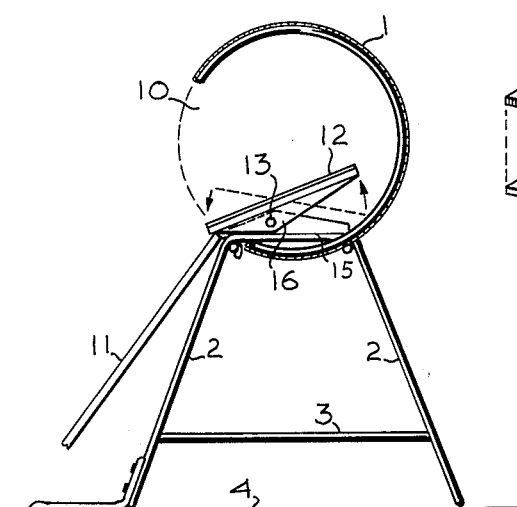
FIGURE 2 is a cross-sectional view taken along the lines 2—2 of FIGURE 1.

In the embodiment of FIGURE 5, there is shown a rocket shaped shell or body 1 provided with three tandem arranged body portions 1C, 1D and 1E in which the section 1D is slightly smaller in diameter than the section 1C and the section 1E is slightly smaller in diameter than the section 1D. Positioned within the rocket shaped body 1 are suitable ejection devices 12C, 12D and 12E each pivotally supported for ejection motion on pivot members such as the pivot members 13 shown at the outer ends of the devices 12C and 12E. The pivot members 13 are supported by suitable bearings in a base member 15 mounted on the frame and leg members 2 as shown in FIGURES 1 and 2 but not shown in detail in this figure for clarity. In this arrangement, the pivot members 13 for each ejection device 12C, 12D and 12E are positioned along transversely displaced center pivot lines X—X, Y—Y and Z—Z, respectively. With the center lines of the pivots 13 so located a person entering the rocket body portion 1C normally tends to maintain the ejection device 12C in its horizontal or non-ejecting position. However, movement of the individual from the body shell portion 1C into the portion 1D causes the individual to now be on the ejection device 12D pivoted at its center at a balance between ejection and maintaining a stable position. Further movement of the individual toward and into the section 1E provides a test of skill in the individual in order to maintain non-ejection in this zone. This is emphasized by the fact that the pivots 13 supporting this ejection device 12E along the center line Z—Z are now remote from the opening 7 and to the side of the center line of the ejection device 12E causing the individual's weight to be so positioned that the ejection device 12E is caused to eject the individual down the body directing device 11. Great skill is needed in order to maintain the ejection device or ejector 12E in its stable non-ejecting position in this area. It is pointed out that the ejection devices 12D and 12E may be weighted to provide for their return to non-ejecting position after use.

It is pointed out that a suitable apron 18 shown in dotted form may also be provided for ease of entry into the rocket body 1 through the entry opening 10. It is also pointed out that more than one individual may enter the opening 10 in sequence thus causing a test of skill and cooperation of the individuals entering the rocket body 1.

In the embodiment shown in FIGURE 6 the rocket shaped shell or body 1 is provided with its opening 7 in the bottom thereof with the ejecting device 12 positioned to normally close the opening 7 during its non-ejection position. In this arrangement, the ejection device 12 is pivoted about its pivot 13 which is on an axis transverse to the longitudinal axis of the ejection device rather than being generally along the longitudinal axis. With the pivot point so positioned on a transverse axis, entry of an individual through the opening 10 into the rocket shaped body 1 would occur with the individual's position on the ejection device normally maintaining the ejection device in non-ejection position until the center of gravity of the individual is past a pivot point 13. At this time the ejection device 12 tilts to the position shown in FIGURE 6 engaging the brace member 3, limiting its angle to a sliding attitude for the individual positioned thereon. This type of structure teaches the proper position for the entry of the human body into water for diving training.

In order to prevent the individual using the ejection device from having his feet trapped by the ejection device striking the upper part of the rocket shaped body 1 a suitable upwardly projecting fin 26 is provided to increase the area above the end of the ejection device 12, when the ejection device 12 is in the ejecting position, to an area adequate to provide clearance for the feet of the individual.

In this device the entry apron 18 may be supported on the ejection device itself or may be supported on the frame and legs 2 in a manner similar to FIGURE 1. In either case the ejector device should be suitably weighted at the apron end to provide for return to its starting position.

While there has been described what is at present considered preferred embodiments of the invention, it will be obvious to those skilled in the art that various changes and modifications may be made therein without departing from the invention, and it is aimed in the appended claim to cover all such changes and modifications as fall within the true spirit and scope of the invention.

What is claimed is:

A device for providing human body muscular development and human body balance skill comprising: a balance control means for launching at least one human body from a prone position with a selected desired body motion and body coordination; a downwardly extending body directing means coupled with said balance control means for continuing launching the body in said desired motion; human body positioning means for assuring entry into said device on other than normal body digits, said body positioning means substantially containing said balance control means for positioning the body in said prone position on said balance control means for obtaining the selected desired motion; and said human body positioning means being a cylindrical shaped shell having an end entrance opening and a longitudinal side exit opening adjacent the body directing means, said body positioning means having a cross-sectional area sufficiently small to require the prone body position on said balance control means, said balance control means being a single longitudinally pivoted body for ejecting the human body onto said body directing means.

References Cited by the Examiner

UNITED STATES PATENTS

| | | | |
|---|---|---|---|
| 651,499 | 6/00 | Byrd | 17—1 |
| 907,215 | 12/08 | Ahrens | 17—1 |
| 1,218,200 | 3/17 | Maynes | 272—1 |
| 1,380,731 | 6/21 | Miller | 272—1 |

FOREIGN PATENTS 26,946   1910   Great Britain.

RICHARD C. PINKHAM, *Primary Examiner.*